United States Patent
Cape

[15] 3,674,979
[45] July 4, 1972

[54] METHOD OF ARC WELDING
[72] Inventor: Arthur T. Cape, Monterey, Calif.
[73] Assignee: Coast Metals, Inc., Little Ferry, N.J.
[22] Filed: Sept. 23, 1970
[21] Appl. No.: 74,930

[52] U.S. Cl. ................................219/137, 219/146, 219/76
[51] Int. Cl. .............................................................B23k 9/00
[58] Field of Search ....................................219/76, 137, 145

[56] References Cited

UNITED STATES PATENTS

| | | | |
|---|---|---|---|
| 3,296,408 | 1/1967 | Arnoldy | 219/76 |
| 3,513,283 | 5/1970 | Arnoldy | 219/76 |
| 3,177,340 | 4/1965 | Danhier | 219/46 |

Primary Examiner—J. V. Truhe
Assistant Examiner—Gale R. Peterson
Attorney—Isler and Ornstein

[57] ABSTRACT

A method of arc welding is disclosed in which a consumable electrode of predetermined composition and the same composition in granular or powdered form are fed separately to the weld area, so that variations in the amount of consumable electrode and granular or powdered composition are of no consequence, and the composition of the deposit will always remain constant. The necessity for careful control of the ratio of feed is thus eliminated, and, moreover, the pool of molten material under the arc is substantially cooler than that of the pool in other or conventional submerged arc welding methods, with the result that there is less dilution of the pool by the base or substrate.

4 Claims, No Drawings

METHOD OF ARC WELDING

Bulkwelding is a submerged arc welding process or method in which an arc is passed between a consumable metal electrode, usually mild steel wire, and a granular metal alloy composition deposited in measured or metered amounts on the base material or work, to produce a deposit on the base material or work of an alloy consisting of the melted wire and the melted granular alloy composition. The method involves maintaining or attempting to maintain a constant deposition relationship or ratio between the consumable electrode and the granular alloy composition.

Such a method, involving the use of a solid wire as the consumable metal electrode, the use of a rotatable feed wheel for metering the amount of granular or powder metal alloy composition to the weld area, and means for automatically coordinating the depositing of the alloy powder and the electrode wire to form the alloy weld or deposit having a closely controlled analysis, is described in U.S. Pats. Nos. 3,060,307; 3,172,991 and 3,260,834.

A variation of the method described in the aforesaid patents is described in U.S. Pat. No. 3,513,288, in which, instead of a wire, a strip of mild steel is formed into a consumable tubular electrode of relatively large diameter, and the granular alloy material is fed, in metered amounts, into the tube at a point just above that at which the strip is closed to form the tube, the granular material flowing through the tube.

In such a process, since all of the alloying ingredients, with the exception of the steel wire or tube, are deposited independently of the wire or tube, and even though it is attempted to maintain a constant deposition relationship or ratio between the wire or tube and the granular alloy composition, any variations in the ratio of the amount of wire or tube to the amount of granular alloy composition or powder changes the composition of the deposit.

In Pat. No. 3,060,307, reference is also made to a ductile tube method, used primarily for hardfacing, in which a tube of ductile metal, which is the matrix metal, and containing carbide-forming and other hardness producing elements, is used. In using this ductile tube method to deposit an alloy such as Stellite 6, a tube made of ductile cobalt strip, and containing the other alloying material in powder form, in amounts which, when melted with the tube, forms the Stellite 6, is used, but it has been found that the pool under the arc is extremely hot, causing the base metal to dilute the coating, producing a coating or deposit which is very high in iron, that is to say, 25 percent or over, unless stringent precautions are taken to prevent or avoid this.

If, however, the filled cobalt tube is used as the consumable electrode, and, at the same time, a Stellite 6 composition, in granular or powder form, is fed separately into the melt, any variations in the ratio of the amount of filled tube to the amount of granular alloy or powder, thus separately supplied to the melt, are of no consequence, since both are of the same composition, and the composition of the deposit will always remain constant.

The necessity for careful control of the ratio of feed is thus eliminated, and, moreover, the pool of molten material under the arc is substantially cooler than that of the pool to which reference has previously been made, with the result that there is less dilution of the pool by the base or substrate, so that the deposit will contain less than 10 percent iron, which is compatible with the results produced by conventional oxy-acetylene welding. I have found that oxy-acetylene welds of Stellite 6 material will contain small amounts of iron, but where large parts are being welded for hardfacing, the iron in the deposits invariably range well above 6 percent.

An example of the proposed process or method is one in which the tubular portion of the consumable filled electrode consists of cobalt, and the granular filler material or powder within the tube is a composition such that when the filled electrode is melted, the deposit will be of the following composition, known as Coast Metal No. 6:

| | |
|---|---|
| Carbon | 0.9 to 1.40% |
| Chromium | 26.0 to 30.0% |
| Nickel | 3.0 Max. |
| Molybdenum | 1.0 Max. |
| Tungsten | 3.5 to 5.5% |
| Iron | 3.0 Max. |
| Silicon | 0.90 to 1.50% |
| Manganese | 0.50 Max. |
| Cobalt | Balance |

The granular alloy composition which is fed to the pool of molten metal separately is also of the same composition as stated above, and may be fed to the pool in any desired manner, that is to say, in a manner not necessarily requiring the use of a metering wheel.

The tubular portion of the electrode may be made from cobalt strip, in the manner described in my U.S. Pat. No. 3,483,724, and may be filled with the granular material of powder in the course of manufacture of the electrode, or the tubular electrode may be a seamless tube of cobalt, which is filled with the granular material or powder.

The method or process which is proposed by this patent application consists broadly therefore in providing a tubular consumable electrode of cobalt or nickel, within which is enclosed material, in granular or powder form, which, when melted with the tubular electrode, provides a deposit of an alloy consisting of the tube and filler, and, at the same time, separately feeding to the pool of molten alloy thus formed a granular material, which, when melted, forms an alloy of the same composition as said deposit.

The method or process also encompasses the use, in such a process, of an alloy which can be made in the form of a solid wire, that is, an unfilled wire, to provide a melted deposit of such alloy, and, at the same time, separately feeding to the pool of alloy thus formed, a granular material, which, when melted, forms an alloy of the same composition formed by the melted solid wire.

Although the invention has been described with reference to an alloy of the type in which cobalt is the predominant or matrix-forming constituent, it is to be understood that the invention is also applicable to any of the Stellite type alloys, as well as alloys of the Hastelloy type, particularly Hastelloy C, in which nickel is the predominant or matrix-forming constituent. In the latter case, the tubular portion of the consumable electrode would be made of nickel strip. An example of such a nickel-base alloy, known as Coast Metal No. 80 has the following composition:

| | |
|---|---|
| Carbon | 0.08 Max. |
| Molybdenum | 16 to 17% |
| Silicon | 1.0 Max. |
| Cobalt | 2.5 Max. |
| Tungsten | 3.75 to 4.5% |
| Manganese | 1.0 Max. |
| Chromium | 15 to 16.5% |
| Iron | 4 to 7% |
| Vanadium | 0.2 to 0.35% |
| Nickel | Remainder |

Where a filled electrode is used, the tubular portion of the electrode may be made of cobalt or nickel, or any other metal which cannot be drawn into wire or which can be drawn into wire only with great difficulty and at considerable expense. The invention, however, also encompasses iron-base alloys, such, for example, as an iron-base alloy, known as Coast Metal No. 19, of the following composition:

| | |
|---|---|
| Carbon | 1.50 to 1.90% |
| Chromium | 34.0 to 36.0% |
| Copper | 1.75 to 2.25% |
| Silicon | 2.00 Max. |
| Iron | Balance |

Where the consumable electrode can be made of an alloy, in wire form, and it is not necessary to provide a filled tube to form the alloy, the invention or process would then consist in feeding the alloy wire to the weld area, and, at the same time, separately feeding the same alloy, in granular or powder form, to the weld area.

Having thus described my invention, I claim:

1. The method of producing a deposit on an area of a substrate, comprising the steps of feeding an alloy, in granular or powder form, onto said area, creating an electric arc with a consumable electrode of the same composition as said alloy, when melted, between said granular alloy and said electrode to melt said electrode and said granular alloy, said consumable electrode consisting of a tube of a metal element selected from the group consisting of cobalt, nickel and iron, and a filler of granular material, which, when melted with said tube, provides a deposit of the same composition as said granular alloy when melted, and feeding both the electrode and granular alloy continuously and at a measured rate during the melting of the electrode to provide an alloy deposit on said area consisting of said molten alloy electrode and molten granular alloy.

2. The method, as defined in claim 1, wherein said consumable electrode consists of a tube of cobalt, and a granular filler, which, when melted with said tube, produces a deposit of the following composition:

| | |
|---|---|
| Carbon | 0.9 to 1.40% |
| Chromium | 26.0 to 30.0% |
| Nickel | 3.0 Max. |
| Molybdenum | 1.0 Max. |
| Tungsten | 3.5 to 5.5% |
| Iron | 3.0 Max. |
| Silicon | 0.90 to 1.50% |
| Manganese | 0.50 Max. |
| Cobalt | Balance |

3. The method, as defined in claim 1, wherein said consumable electrode consists of a tube of nickel, and a granular filler, which, when melted with said tube, produces a deposit of the following composition:

| | |
|---|---|
| Carbon | 0.08 Max. |
| Molybdenum | 16 to 17% |
| Silicon | 1.0 Max. |
| Cobalt | 2.5 Max. |
| Tungsten | 3.75 to 4.5% |
| Manganese | 1.0 Max. |
| Chromium | 15 to 16.5% |
| Iron | 4 to 7% |
| Vanadium | 0.2 to 0.35% |
| Nickel | Remainder |

4. The method, as defined in claim 1, wherein said consumable electrode consists of a tube of iron, and a granular filler, which, when melted with said tube, produces a deposit of the following composition:

| | |
|---|---|
| Carbon | 1.50 to 1.90% |
| Chromium | 34.0 to 36.0% |
| Copper | 1.75 to 2.25% |
| Silicon | 2.00 Max. |
| Iron | Balance |

* * * * *